(12) United States Patent
Kadono (10) Patent No.: US 7,369,971 B2
(45) Date of Patent: May 6, 2008

(54) METHOD AND APPARATUS FOR GENERATING THREE-DIMENSIONAL SHAPE DATA

(75) Inventor: Mitsuhiko Kadono, Yamatokoriyama (JP)

(73) Assignees: Mori Seiki Co., Ltd., Yamatokoriyama-shi (JP); Intelligent Manufacturing Systems International, Sacramento, CA (US)

( * ) Notice: Subject to any disclaimer, the term of this patent is extended or adjusted under 35 U.S.C. 154(b) by 805 days.

(21) Appl. No.: 10/034,122

(22) Filed: Jan. 3, 2002

(65) Prior Publication Data

US 2002/0091457 A1   Jul. 11, 2002

(30) Foreign Application Priority Data

Jan. 11, 2001   (JP) .............................. 2001-003548

(51) Int. Cl.
*G06G 7/48*   (2006.01)

(52) U.S. Cl. .................. 703/1; 703/7; 700/98; 700/159

(58) Field of Classification Search .................... 703/1, 703/10, 7; 700/98, 159
See application file for complete search history.

(56) References Cited

U.S. PATENT DOCUMENTS 5,317,519 A * 5/1994 Maeda ........................ 700/184
6,341,996 B1 * 1/2002 Brien et al. ..................... 451/8

FOREIGN PATENT DOCUMENTS

| JP | 5-250024 | 9/1993 |
|---|---|---|
| JP | 6-059717 | 3/1994 |
| JP | 8-150540 | 6/1996 |

OTHER PUBLICATIONS

William J. Schroeder, Jonathan A. Zarge, William E. Lorensen; "Decimation of Triangle Meshes"; Jul. 1992; ACM; pp. 65-70.*
Christoph M. Hoffmann, "Geometric and Solid Modeling: An Introduction", 1989, Morgan Kaufmann Publishers Inc., pp. 80-93.*

(Continued)

*Primary Examiner*—Paul Rodriguez
*Assistant Examiner*—Jason Proctor
(74) *Attorney, Agent, or Firm*—Westerman, Hattori, Daniels & Adrian, LLP.

(57) ABSTRACT

The present invention provides a method and an apparatus for generating post-machining three-dimensional shape data for a workpiece on the basis of an NC program. The three-dimensional shape data generating apparatus comprises: a stock blank lattice point generating section (11) which represents the shape of a stock blank for the workpiece by three-dimensional lattice point data (L) comprising a multiplicity of lattice points on the basis of stock blank shape data; a tool path processing section (12) which generates data indicative of a tool traveling region in which the tool is to move with respect to the workpiece on the basis of the NC program, tool shape data and the stock blank shape data, then removes lattice points located in the tool traveling region; and a shape data generating section (15) which generates the post-machining three-dimensional shape data for the workpiece on the basis of the remaining lattice points.

4 Claims, 8 Drawing Sheets

OTHER PUBLICATIONS

Edward Angel, "Computer Graphics", 1990, Addison-Wesley Publishing Corporation, 300-303.*

Jeff Orchard and Torsten Möller, "Accelerated splatting using a 3D adjacency data structure", Jun. 9, 2001, "Graphics Interface 2001" (conference), citation + pp. 1-10.*

Sarah F. Frisken-Gibson, "Using Linked Volumes to Model Object Collisions, Deformation, Cutting, Carving, and Joining", 1999, IEEE, IEEE Transactions on Visualization and Computer Graphics vol. 5 No. 4, pp. 333-348.*

* cited by examiner

METHOD AND APPARATUS FOR GENERATING THREE-DIMENSIONAL SHAPE DATA

BACKGROUND OF THE INVENTION

1. Field of the Invention

The present invention relates to a method and an apparatus for generating three-dimensional shape data indicative of a shape of a workpiece to be obtained after machining on the basis of an NC program for an NC machine tool.

2. Description of the Prior Art

NC machine tools are generally adapted to machine a workpiece by moving a tool under numerical control according to an NC program including tool traveling path and the like. The NC program is generated manually by a programmer and, at present, automatically by means of an automatic programming apparatus. The automatic programming apparatus sequentially performs an automatic determining process of tool to be used, an automatic determining process of cutting condition and an automatic determining process of machining sequence on the basis of design data (hereinafter referred to as "CAD data") generated by a CAD (computer aided design), tool shape data, cutting condition data and the like for generation of programming base data, and then generates the NC program on the basis of the programming base data thus generated. The CAD data is three-dimensional shape data indicative of a final shape and dimensions of the workpiece to be obtained after the machining.

In some case, a machining factory receives only an NC program generated by a CAD and an automatic programming apparatus from a customer to perform a workpiece machining operation. Where the workpiece machining operation performed on the basis of the NC program by means of an NC machine tool fails to provide an expected workpiece shape, the machining factory cannot review CAD data (three-dimensional shape data) on the basis of the NC program and, hence, cannot change the workpiece shape. Therefore, the machining factory has to request the customer to modify the NC program. For the modification of the NC program, it is necessary to modify the CAD data by means of the CAD and perform various processes by means of the automatic programming apparatus. This requires much time before the machining factory receives the modified NC program, resulting in downtime of the NC machine tool and, hence, reduction in productivity.

Further, tool traveling paths cannot be changed for modification of the NC program because the three-dimensional shape data cannot be reexamined on the basis of the NC program, even if a trouble occurs such that a tool is brought into thorough contact with the workpiece in a pocket corner thereof during the machining to leave chattering marks on the workpiece.

It is therefore an object of the present invention to provide a method and an apparatus for generating three-dimensional shape data indicative of a shape of a workpiece to be obtained after machining on the basis of an NC program for an NC machine tool.

SUMMARY OF THE INVENTION

In accordance with the present invention to achieve the aforesaid object, there is provided a method for generating post-machining three-dimensional shape data indicative of a shape of a workpiece to be obtained after machining on the basis of an NC program including tool traveling path for a tool, tool shape data indicative of a shape of the tool and stock blank shape data indicative of a shape of a stock blank for the workpiece to be machined with the tool in an NC machine tool, the method comprising the steps of: representing the shape of the stock blank for the workpiece by three-dimensional lattice point data comprising a multiplicity of lattice points arranged along three axes extending perpendicularly to each other on the basis of the stock blank shape data, the multiplicity of lattice points being each defined by three-dimensional coordinate data and connection information indicative of relationships between the each lattice point and lattice points located adjacent thereto along the three axes; generating data indicative of a tool traveling region in which the tool is to move with respect to the workpiece on the basis of the NC program, the tool shape data and the stock blank shape data, removing lattice points of the three-dimensional lattice point data located in the tool traveling region, and updating connection information for the remaining lattice points; and generating the post-machining three-dimensional shape data for the workpiece on the basis of three-dimensional coordinate data and the connection information for the remaining lattice points.

The aforesaid method can advantageously be implemented by the following apparatus. The apparatus is adapted for generating post-machining three-dimensional shape data indicative of a shape of a workpiece to be obtained after machining on the basis of an NC program including tool traveling path for a tool, tool shape data indicative of a shape of the tool and stock blank shape data indicative of a shape of a stock blank for the workpiece to be machined with the tool in an NC machine tool, and comprises: a stock blank lattice point generating section which represents the shape of the stock blank for the workpiece by three-dimensional lattice point data comprising a multiplicity of lattice points arranged along three axes extending perpendicularly to each other on the basis of the stock blank shape data, the multiplicity of lattice points being each defined by three-dimensional coordinate data and connection information indicative of relationships between the each lattice point and lattice points located adjacent thereto along the three axes; a tool path processing section which generates data indicative of a tool traveling region in which the tool is to move with respect to the workpiece on the basis of the NC program, the tool shape data and the stock blank shape data, then removes lattice points of the three-dimensional lattice point data located in the tool traveling region, and updates connection information for the remaining lattice points; and a shape data generating section which generates the post-machining three-dimensional shape data for the workpiece on the basis of three-dimensional coordinate data and the connection information for the remaining lattice points.

With the three-dimensional shape data generating method and apparatus, the shape of the stock blank for the workpiece is represented by the three-dimensional lattice point data comprising the multiplicity of lattice points arranged along the three axes (X-, Y- and Z-axes) extending perpendicularly to each other on the basis of the stock blank shape data, and the multiplicity of lattice points are each defined by the three-dimensional coordinate data (Xn, Yn, Zn) and the connection information indicative of the relationships between the each lattice point and the lattice points located adjacent thereto along the three axes in six axial directions (−x, +x, −y, +y, −z, +z). The term "connection information" herein means information indicative of whether or not lattice points are present at positions adjacent to a lattice point of interest along the three axes in the six axial directions.

Then, data indicative of a region of tool to be moved with respect to the workpiece is generated on the basis of the NC program, the tool shape data and the stock blank shape data. The tool region is moved on the basis of the NC program. Then, the lattice points located in the locus of the tool region (tool traveling region) are removed, and the connection information for the remaining lattice points is updated for generation of post-machining three-dimensional lattice point data. Thus, the post-machining three-dimensional lattice point data reflects the three-dimensional shape of the workpiece to be obtained after the machining.

In turn, the post-machining three-dimensional shape data for the workpiece is generated on the basis of the three-dimensional coordinate data and the connection information for the remaining lattice points. More specifically, positional relationships of the remaining lattice points are determined by the three-dimensional coordinate data and the three-axis/six-direction connection information for the remaining lattice points, whereby the post-machining three-dimensional shape data for the workpiece can be generated.

The three-dimensional shape data generating method and apparatus make it possible to retrospectively analyze the NC program to generate the post-machining three-dimensional shape data for the workpiece. The final shape and dimensions of the workpiece can be determined on the basis of the three-dimensional shape data thus generated. Therefore, the NC program can be modified or regenerated by properly processing the three-dimensional shape data obtained by the retrospective analysis of the NC program, even if a machining factory receives only the NC program from a customer. This leads to an improved productivity at the machining factory, and makes it possible to deal with a machining defect. In addition, three-dimensional shape data may be accumulated for accumulation of machining condition data of tool for workpieces.

DESCRIPTION OF THE PREFERRED EMBODIMENT

Figure 1:
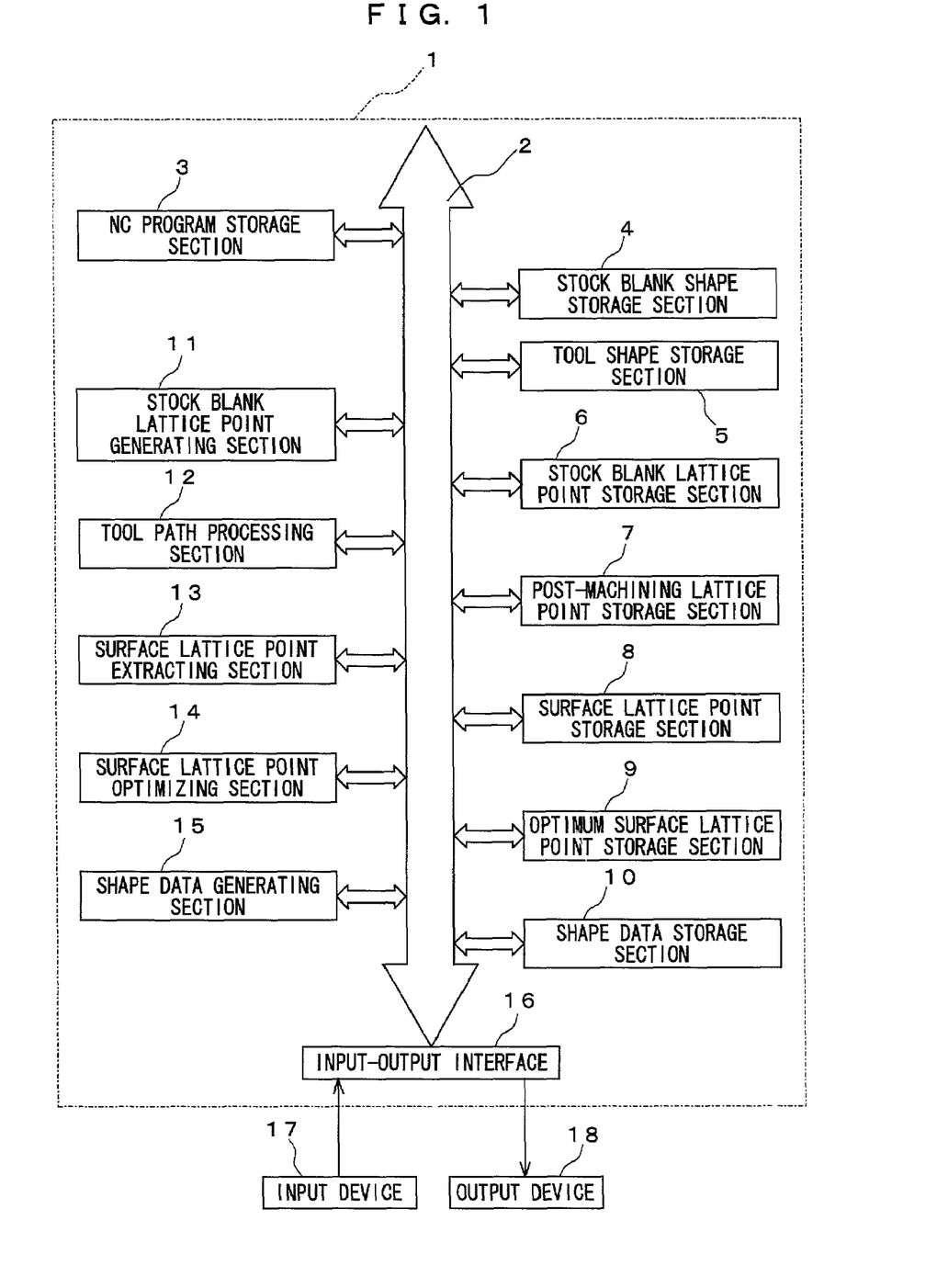
FIG. 1 is a block diagram schematically illustrating the construction of a three-dimensional shape data generating apparatus according to one embodiment of the present invention.

A three-dimensional shape data generating method and a three-dimensional shape data generating apparatus according to one embodiment of the present invention will hereinafter be described with reference to FIGS. 1 to 15. For convenience, an explanation will be given first to the three-dimensional shape data generating apparatus, and then to the three-dimensional shape data generating method. FIG. 1 is a block diagram schematically illustrating the construction of the three-dimensional shape data generating apparatus.

In FIG. 1, the three-dimensional shape data generating apparatus 1 includes storage means such as an NC program storage section 3, a stock blank shape storage section 4, a tool shape storage section 5, a stock blank lattice point storage section 6, a post-machining lattice point storage section 7, a surface lattice point storage section 8, an optimum surface lattice point storage section 9 and a shape data storage section 10. The three-dimensional shape data generating apparatus 1 further includes processing means such as a stock blank lattice point generating section 11, a tool path processing section 12, a surface lattice point extracting section 13, a surface lattice point optimizing section 14 and a shape data generating section 15. The storage means 3 to 10 and the processing means 11 to 15 are interconnected to each other via a bus line 2, which is connected to an input-output interface 16. An input device 17 and an output device 18 for inputting and outputting various data are connected to the input-output interface 16.

The NC program storage section 3 stores therein an NC program inputted from the input device 17 via the input-output interface 16 and the bus line 2. The NC program which includes tool traveling path and the like is automatically generated by an automatic programming apparatus not shown. The automatic programming apparatus sequentially performs an automatic determining process of tool to be used, an automatic determining process of cutting condition and an automatic determining process of machining sequence on the basis of CAD data generated by a CAD, tool shape data, cutting condition data and the like for generation of programming base data, and then generates the NC program on the basis of the programming base data thus generated. The CAD data is three-dimensional shape data indicative of a final shape and dimensions of the workpiece to be obtained after the machining.

The stock blank shape storage section 4 stores therein stock blank shape data indicative of a shape of a stock blank for a workpiece to be machined by an NC machine tool, and the stock blank shape data is inputted from the input device 17 via the input-output interface 16 and the bus line 2. The tool shape storage section 5 stores therein tool shape data indicative of a shape of a tool to be used for the machining of the workpiece, and the tool shape data is inputted from the input device 17 via the input-output interface 16 and the bus line 2. The stock blank shape data includes the shape and dimensions of the stock blank for the workpiece before the machining, and the tool shape data includes the dimensions (e.g., diameter and length) of the tool.

Figure 2:
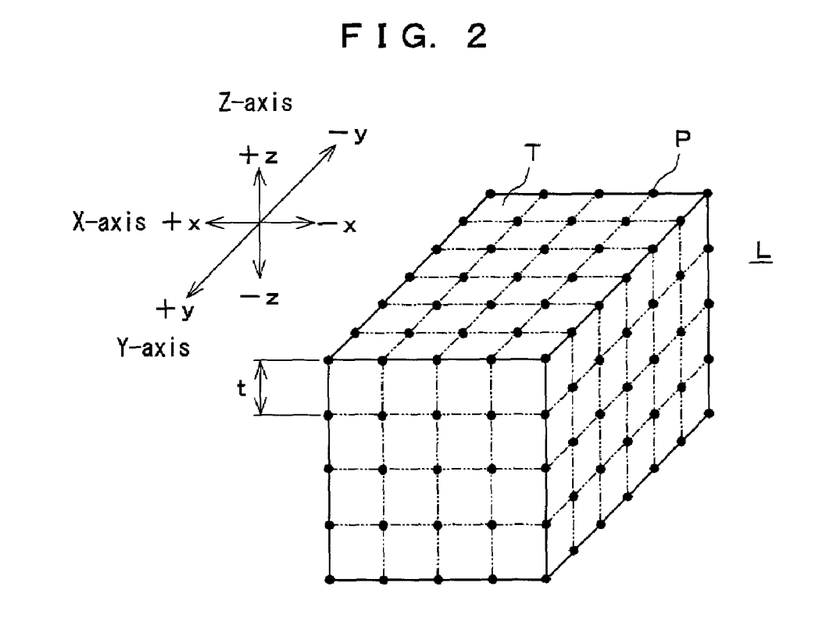
FIG. 2 is a perspective view illustrating the shape of a stock blank for a workpiece represented by three-dimensional lattice point data by a stock blank lattice point generating section according to the embodiment.
Figure 3:
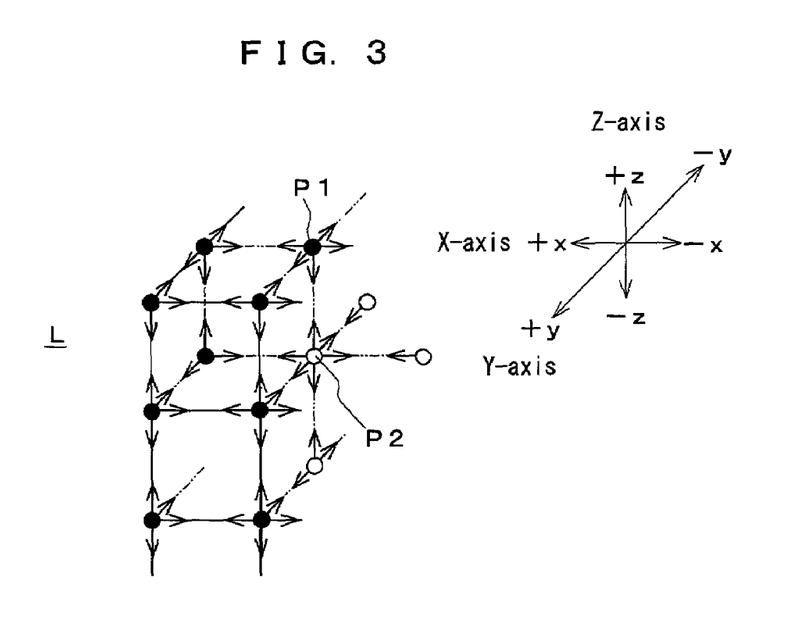
FIG. 3 is an enlarged perspective view illustrating relationships between lattice points shown in FIG. 2.

The stock blank lattice point generating section 11 reads the stock blank shape data from the stock blank shape storage section 4, and converts the stock blank shape data into three-dimensional lattice point data. More specifically, the stock blank lattice point generating section 11 determines the shape and dimensions of the stock blank for the workpiece T on the basis of the stock blank shape data, and generates three-dimensional lattice point data L indicative of the shape of the stock blank as shown in FIG. 2. The three-dimensional lattice point data L includes a multiplicity of lattice points P arranged along three axes (X-, Y- and Z-axes) extending perpendicularly to each other as shown in FIGS. 2 and 3. These lattice points P constitute a cubic lattice.

As shown in FIGS. 2 and 3, the lattice points P are each defined by a combination of three-dimensional coordinate data (Xn, Yn, Zn) and connection information (−x, +x, −y, +y, −z, +z) including six connection signs indicative of whether or not lattice points P are present at positions adjacent to a lattice point of interest in six axial directions, i.e., X-axis positive and negative directions, Y-axis positive and negative directions and Z-axis positive and negative directions as shown in FIG. 3. Thus, the lattice points P of the three-dimensional lattice point data L are each represented as (Xn, Yn, Zn, −x, +x, −y, +y, −z, +z). Where no lattice point P is present at any one of the positions adjacent to the lattice point P of interest, the lattice point P has a null connection sign. For example, a lattice point P1 is present on a surface of the stock blank represented by the three-dimensional lattice point data L as shown in FIG. 3, so that no lattice point is present at a position adjacent to the lattice point P1 in the Z-axis positive direction. Therefore, the lattice point P1 (hereinafter referred to as "surface lattice point") has connection information (−x, +x, −y, +y, −z, 0) with a null connection sign for a Z-axis positive direction. On the other hand, a lattice point P2 is located inside the stock blank represented by the three-dimensional lattice point data L as shown in FIG. 3, so that lattice points are present at all the positions adjacent to the lattice point P2 along the three axes in the six axial directions. Therefore, the lattice point P2 (hereinafter referred to as "inside lattice point") has connection information (−x, +x, −y, +y, −z, +z).

The stock blank lattice point generating section 11 stores the three-dimensional lattice point data L generated in the aforesaid manner in the stock blank lattice point storage section 6. Respective adjacent pairs of lattice points P arranged along the three axes are spaced by a distance t of about 1 μm to about 10 μm as shown in FIG. 2, which depends on a machining accuracy of the NC machine tool and the shape of the stock blank for the workpiece T.

Figure 4:
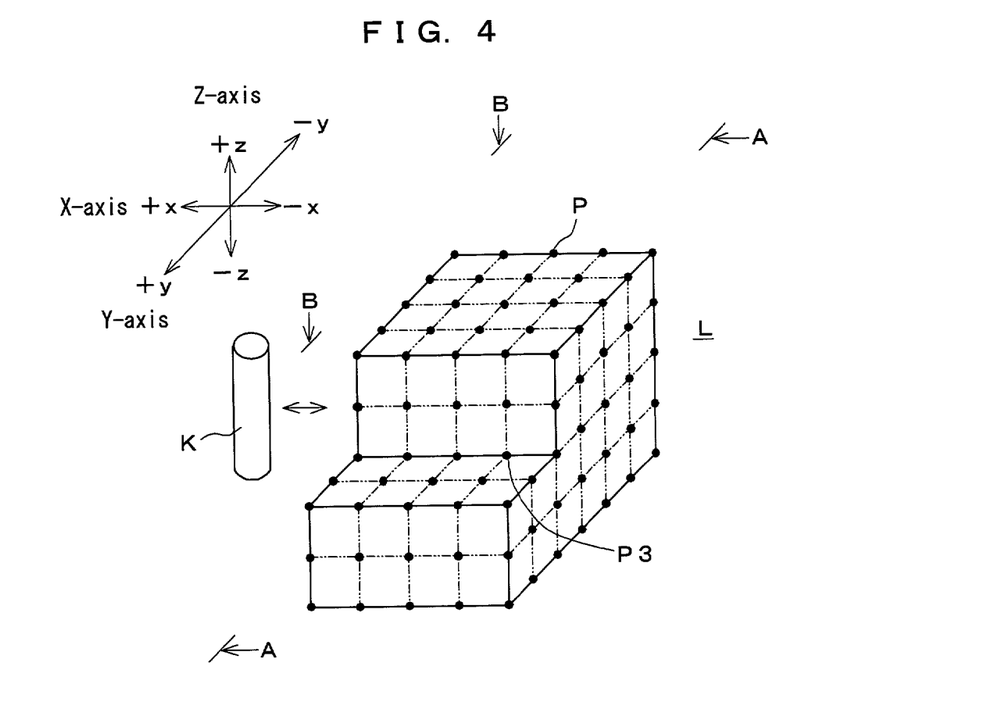
FIG. 4 is a perspective view illustrating a state where particular lattice points are removed by a tool path processing section according to the embodiment.
Figure 5:
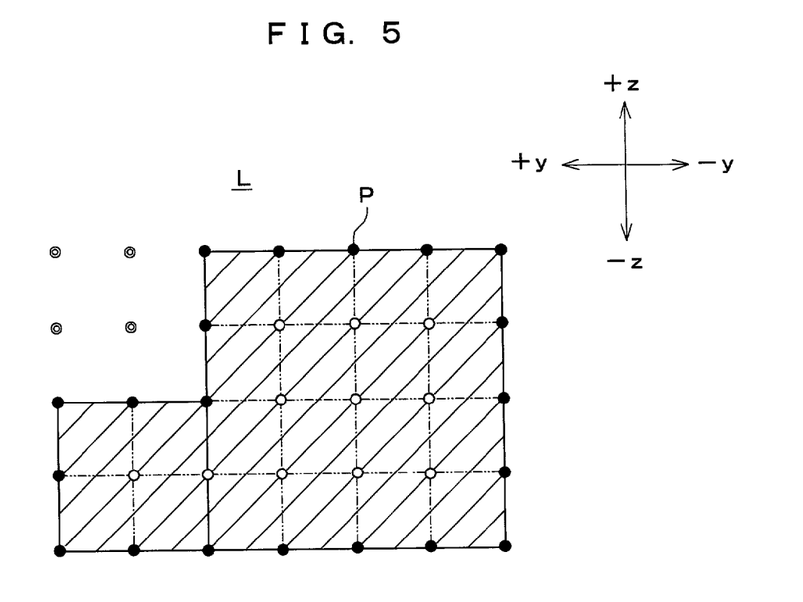
FIG. 5 is an enlarged sectional view as seen in an arrow direction A-A in FIG. 4.

The tool path processing section 12 reads the NC program, the stock blank shape data, the tool shape data and the three-dimensional lattice point data L from the NC program storage section 3, the stock blank shape storage section 4, the tool shape storage section 5 and the stock blank lattice point storage section 6, respectively, and defines a tool region K as shown in FIG. 4. Then, the tool path processing section 12 moves the tool region K on the basis of the NC program, and removes lattice points P of the three-dimensional lattice point data L (indicated by ⊙ marks) located in the locus of the tool region K (tool traveling region) as shown in FIGS. 4 and 5. Thereafter, the tool path processing section 12 updates the connection information for the remaining lattice points P, thereby updating the three-dimensional lattice point data L. That is, lattice points P which have been located adjacent the removed lattice points P each have a null connection sign for a corresponding axial direction in the connection information, and are exposed to surfaces of the workpiece represented by the updated three-dimensional lattice point data L. Thus, the three-dimensional shape of the workpiece T to be obtained after the machining is represented by the updated three-dimensional lattice point data L (hereinafter referred to as "post-machining three-dimensional lattice point data") constituted by the remaining lattice points P. Then, the tool path processing section 12 stores the post-machining three-dimensional lattice point data L in the post-machining lattice point storage section 7.

The surface lattice point extracting section 13 reads the post-machining three-dimensional lattice point data L (the remaining lattice points P) from the post-machining lattice point storage section 7, and extracts surface lattice points P which define surfaces of the workpiece T to be obtained after the machining.

Figure 6:
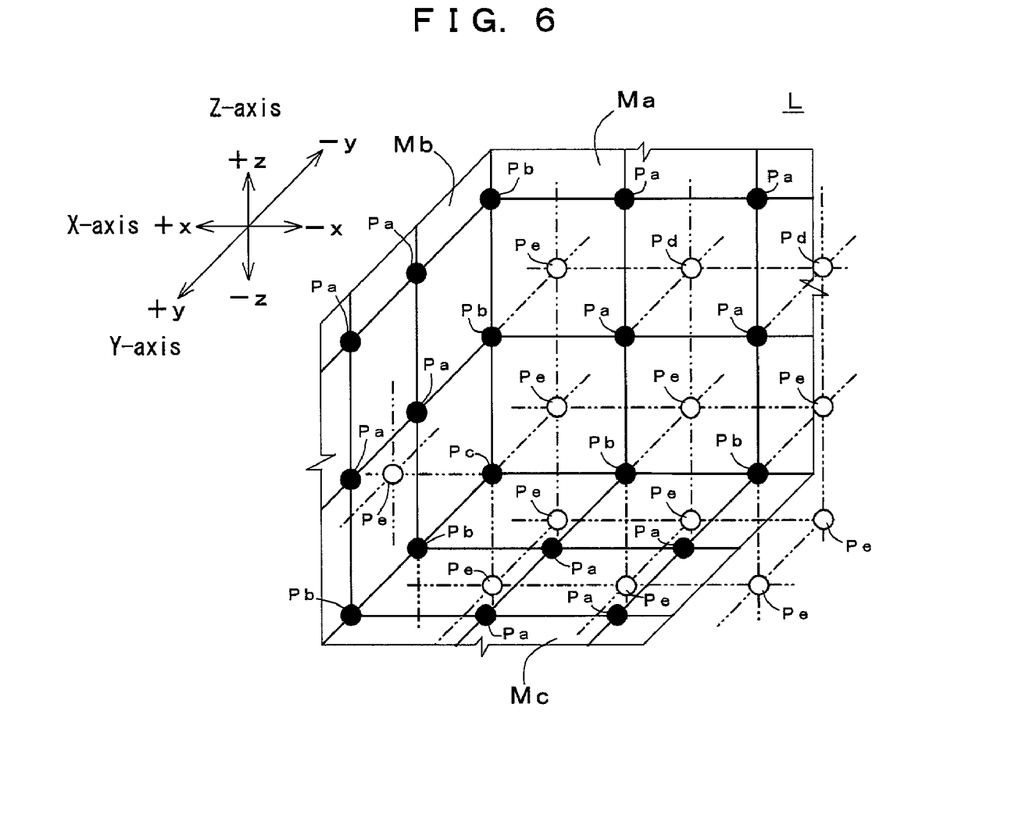
FIG. 6 is a diagram for explaining a surface lattice point extracting process according to the embodiment.

More specifically, the surface lattice point extracting section 13 extracts lattice points P each having a null connection sign for at least one of the six axial directions in the connection information from the lattice points P of the read post-machining three-dimensional lattice point data L, and regards the extracted lattice points P as surface lattice points. It is always true that a lattice point P having a null connection sign for one axial direction in connection information is located on a surface of the workpiece represented by the post-machining three-dimensional lattice point data L. Such a surface lattice point is hereinafter referred to as "perfect surface lattice point". FIG. 6 illustrates a portion of the workpiece represented by the three-dimensional lattice point data L and having three surfaces Ma, Mb and Mc extending perpendicularly to each other. In FIG. 6, perfect surface lattice points are indicated by "Pa". The surface lattice point extracting section 13 discriminates the extracted perfect surface lattice points Pa from the other lattice points P, for example, by turning on surface lattice point flags.

Then, the surface lattice point extracting section 13 extracts lattice points P adjacent to the perfect surface lattice points Pa from the residual lattice points P, and further extracts, from the extracted lattice points P, lattice points P located adjacent the perfect surface lattice points Pa in directions opposite from null-sign axial directions with all the adjacent surface lattice points P being the perfect surface lattice points Pa (i.e., lattice points P which are located adjacent the perfect surface lattice points Pa only in null-sign axial directions but not adjacent the perfect surface lattice points Pa in non-null-sign axial directions). The lattice points P thus extracted are regarded as inside lattice points. In FIG. 6, such inside lattice points are indicated by "Pd". On the other hand, a lattice point P3 shown in FIG. 4 is not regarded as an inside lattice point, because the lattice point P3 is located adjacent a perfect surface lattice point Pa in a non-null-sign axial direction. The surface lattice point extracting section 13 discriminates the extracted inside lattice points Pd from the other lattice points P, for example, by turning on inside lattice point flags.

Subsequently, the surface lattice point extracting section 13 regards lattice points P obtained by excluding the inside lattice points Pd from the lattice points P adjacent to the perfect surface lattice points Pa extracted in the aforesaid manner as surface lattice points. In FIG. 6, such surface lattice points are indicated by "Pb". Then, the surface lattice point extracting section 13 turns on surface lattice point flags for the surface lattice points Pb thus extracted.

In turn, the surface lattice point extracting section 13 extracts lattice points P located adjacent the surface lattice points Pb along all the three axes from the residual lattice points P, and regards the lattice points P thus extracted as surface lattice points. In FIG. 6, such surface lattice points are indicated by "Pc". Then, the surface lattice point extracting section 13 turns on surface lattice point flags for the surface lattice points Pc thus extracted.

Subsequently, the surface lattice point extracting section 13 regards the residual lattice points P as inside lattice points. In FIG. 6, such inside lattice points are indicated by "Pe". Then, the surface lattice point extracting section 13 turns on inside lattice point flags for the inside lattice points Pe thus extracted.

Then, the surface lattice point extracting section 13 stores three-dimensional lattice point data L constituted by the surface lattice points Pa, Pb, Pc extracted in the aforesaid manner in the surface lattice point storage section 8.

In FIGS. 2 to 9, the surface lattice points are indicated by ● marks. In FIGS. 3, 5 and 6, the inside lattice points are indicated by ○ marks.

Figure 7:
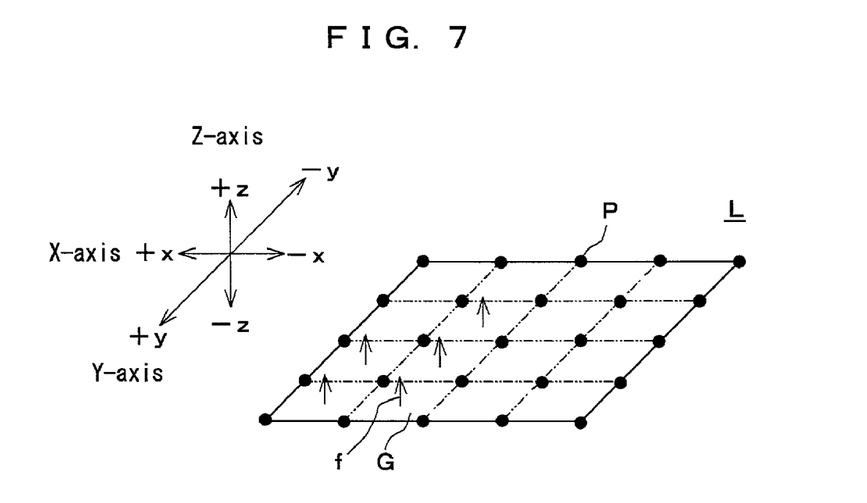
FIG. 7 is a diagram as seen in an arrow direction B-B in FIG. 4 for explaining a surface lattice point optimizing process.

The surface lattice point optimizing section 14 reads the three-dimensional lattice point data L constituted by the surface lattice points P from the surface lattice point storage section 8 to determine the characteristic configuration of the workpiece, and optimizes the surface lattice points P. More specifically, as shown in FIG. 7, a multiplicity of squares G are defined by adjacent surface lattice points P, and normal vectors f are set on the respective squares G. The characteristic configuration of the workpiece is determined by analyzing the directions of the normal vectors f. The characteristic configuration indicates whether or not each two adjacent squares G are coplanar. Where normal vectors f of adjacent squares G are parallel to each other as shown in FIG. 7, for example, the adjacent squares G are coplanar.

Figure 8:
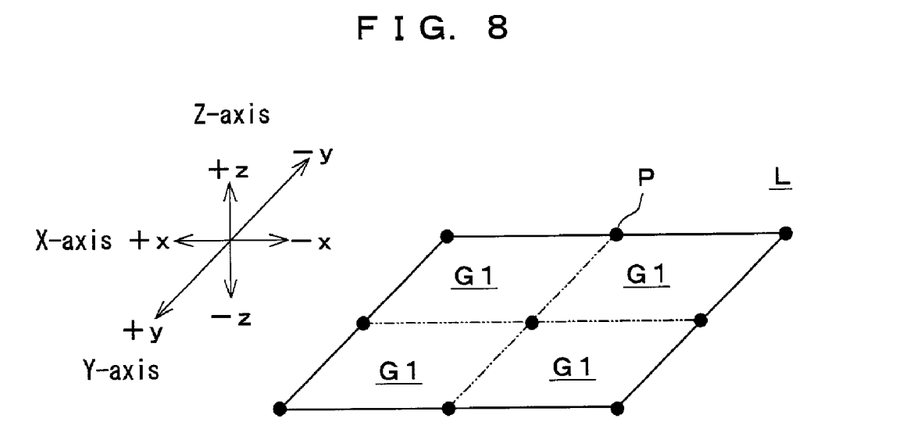
FIG. 8 is a diagram as seen in the arrow direction B-B in FIG. 4 for explaining the surface lattice point optimizing process.
Figure 9:
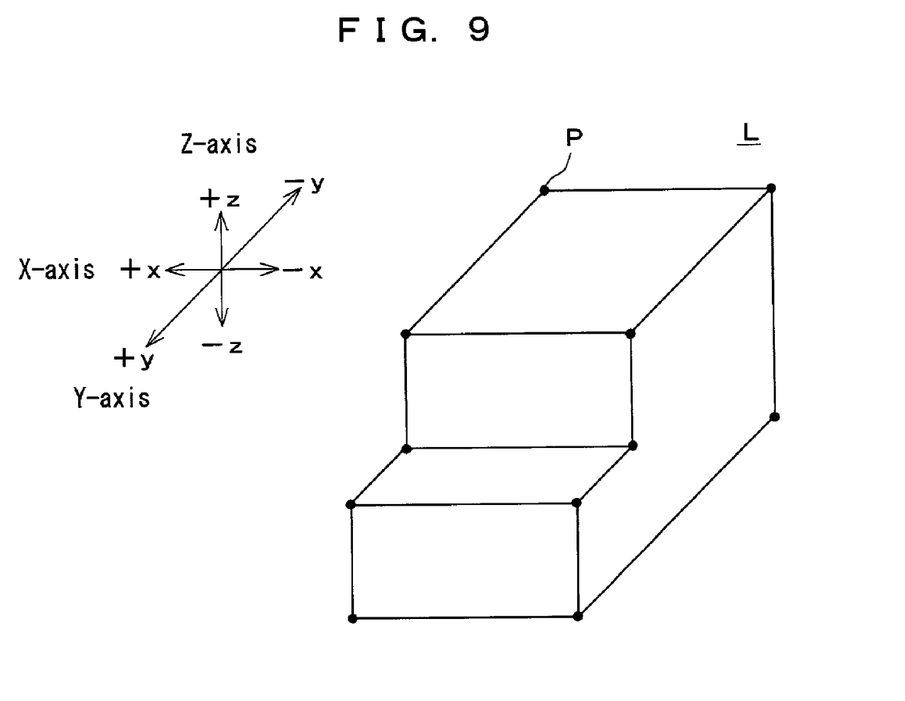
FIG. 9 is a diagram for explaining three-dimensional lattice point data obtained after the surface lattice point optimizing process.

Then, the surface lattice point optimizing section 14 combines coplanar adjacent squares G with each other, and extracts surface lattice points P which define the resulting greater size squares G1 as shown in FIG. 8 for the optimization. The characteristic configuration extracting operation and the lattice point optimizing operation are performed once or repeated a plurality of times to define the respective surfaces of the workpiece to be obtained after the machining by a possible minimum number of surface lattice points P as shown in FIG. 9. Then, the surface lattice point optimizing section 14 stores three-dimensional lattice point data L constituted by the optimum surface lattice points P in the optimum surface lattice point storage section 9.

The shape data generating section 15 reads the three-dimensional lattice point data L constituted by the optimum surface lattice points P from the optimum surface lattice point storage section 9, and generates post-machining three-dimensional shape data indicative of the shape of the workpiece T to be obtained after the machining on the basis of the three-dimensional lattice point data L thus read. More specifically, the shape data generating section 15 defines the respective surfaces of the workpiece to be obtained after the machining by interconnecting each two adjacent optimum surface lattice points P located in any of the six axial directions (−x, +x, −y, +y, −z, +z) on the basis of coordinate data and connection information which define the optimum surface lattice points P as shown in FIG. 9. The each two adjacent optimum surface lattice points P to be interconnected are determined on the basis of the coordinate data and the six axial direction connection signs in the connection information, whereby the post-machining three-dimensional shape data for the workpiece is generated. The shape and dimensions of the workpiece to be obtained after the machining are computed on the basis of the coordinate data for the optimum surface lattice points P. Then, the shape data generating section 15 stores the generated three-dimensional shape data in the shape data storage section 10.

Figure 10:
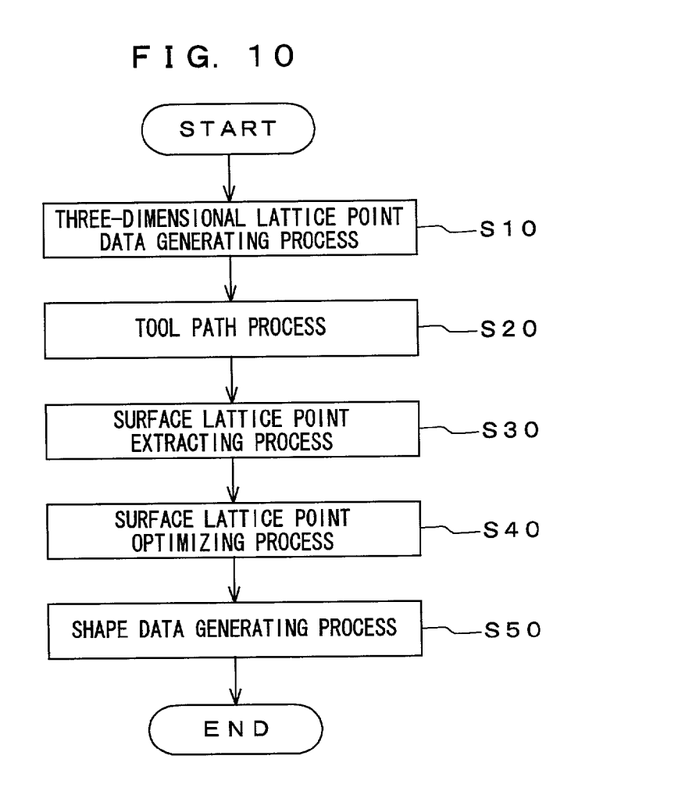
FIG. 10 is a flow chart for explaining a three-dimensional shape data generating method according to the embodiment of the present invention.

With reference to FIGS. 10 to 15, a three-dimensional shape data generating method will be described which is implemented by the three-dimensional shape data generating apparatus 1 having the aforesaid construction. FIG. 10 is a flow chart for explaining the three-dimensional shape data generating method.

As shown in FIG. 10, the three-dimensional shape data generating method according this embodiment is implemented by sequentially performing a three-dimensional lattice point data generating process (Step S10), a tool path process (Step S20), a surface lattice point extracting process (Step S30), a surface lattice point optimizing process (Step S40) and a shape data generating section (Step S50). The respective processes will hereinafter be described with reference to flow charts of FIGS. 11 to 15.

(1) Three-Dimensional Lattice Point Data Generating Process

Figure 11:
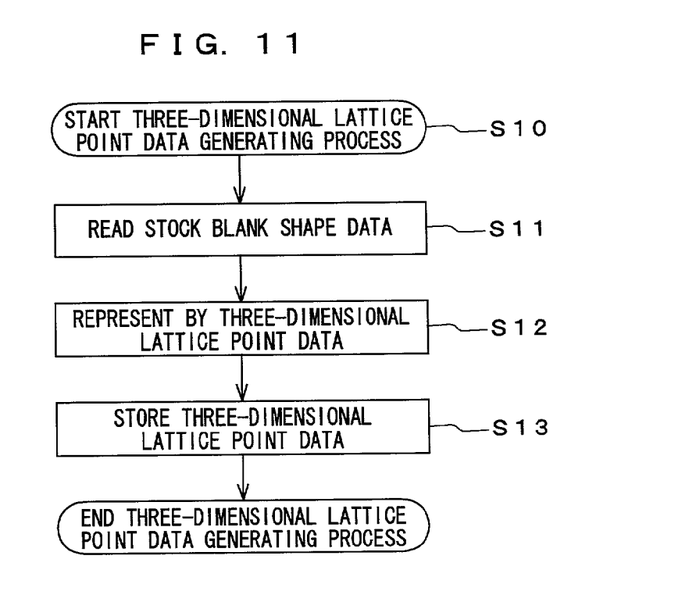
FIG. 11 is a flow chart for explaining a three-dimensional lattice point data generating process to be performed by the stock blank lattice point generating section.

The three-dimensional lattice point data generating process (Step S10) is performed by the stock blank lattice point generating section 11. As shown in FIG. 11, the stock blank lattice point generating section 11 first reads the stock blank shape data from the stock blank shape storage section 4 (Step S11). On the basis of the stock blank shape data, the stock blank lattice point generating section 11 represents the shape of the stock blank for the workpiece T by three-dimensional lattice point data L which comprises a multiplicity of lattice points P each defined by three-dimensional coordinate data (Xn, Yn, Zn) and connection information as shown in FIGS. 2 and 3 (Step S12). The three-dimensional lattice point data L thus obtained is stored in the stock blank lattice point storage section 6 (Step S13).

(2) Tool Path Process

Figure 12:
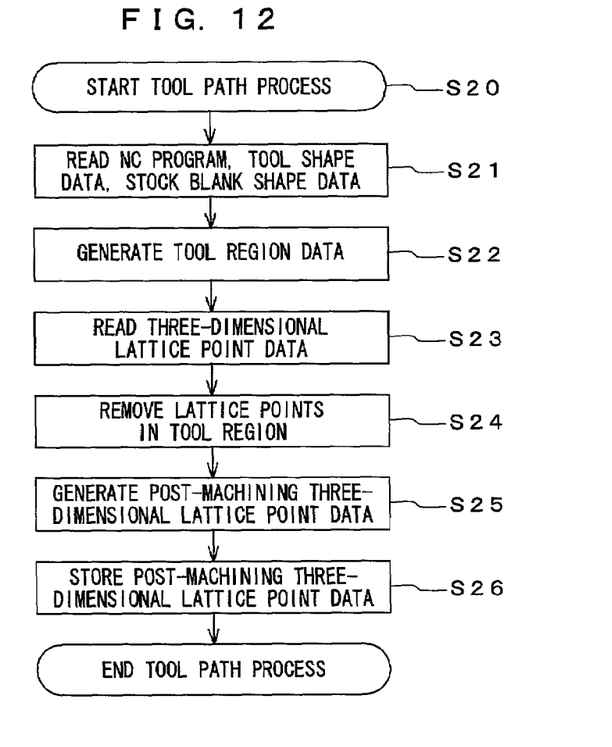
FIG. 12 is a flow chart for explaining a tool path process to be performed by a tool path processing section.

The tool path process (Step S20) is performed by the tool path processing section 12. As shown in FIG. 12, the tool path processing section 12 reads the NC program, the stock blank shape data and the tool shape data from the NC program storage section 3, the stock blank shape storage section 4 and the tool shape storage section 5, respectively (Step S21), and generates data indicative of a tool region K as shown in FIG. 4 (Step S22). Then, the tool path processing section 12 reads the three-dimensional lattice point data L from the stock blank lattice point storage section 6 (Step S23). The tool path processing section 12 moves the tool region K on the basis of the NC program as shown in FIGS. 4 and 5, and removes lattice points P of the three-dimensional lattice point data L (indicated by ⊙ marks in FIG. 5) located in the locus of the tool region K (Step S24). Thereafter, the tool path processing section 12 updates connection information for the remaining lattice points P for generation of post-machining three-dimensional lattice point data L (Step S25), and stores the post-machining three-dimensional lattice point data L in the post-machining lattice point storage section 7 (Step S26).

(3) Surface Lattice Point Extracting Process

The surface lattice point extracting process (Step S30) is performed by the surface lattice point extracting section 13.

Figure 13:
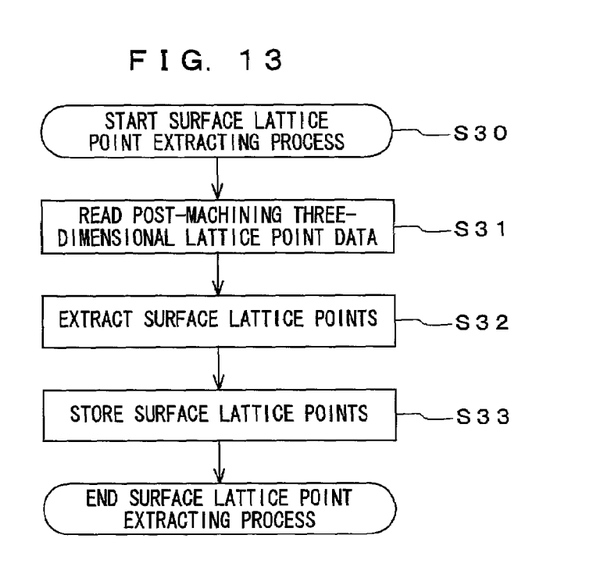
FIG. 13 is a flow chart for explaining the surface lattice point extracting process to be performed by a surface lattice point extracting section.

As shown in FIG. 13, the surface lattice point extracting section 13 reads the post-machining three-dimensional lattice point data L from the post-machining lattice point storage section 7 (Step S31), and determines whether each of the lattice points P of the post-machining three-dimensional lattice point data L is a surface lattice point P or an inside lattice point P on the basis of the connection information for the lattice points P to extract surface lattice points P (Step S32). Then, three-dimensional lattice point data L constituted by the extracted surface lattice points P is stored in the surface lattice point storage section 8 (Step S33).

(4) Surface Lattice Point Optimizing Process

Figure 14:
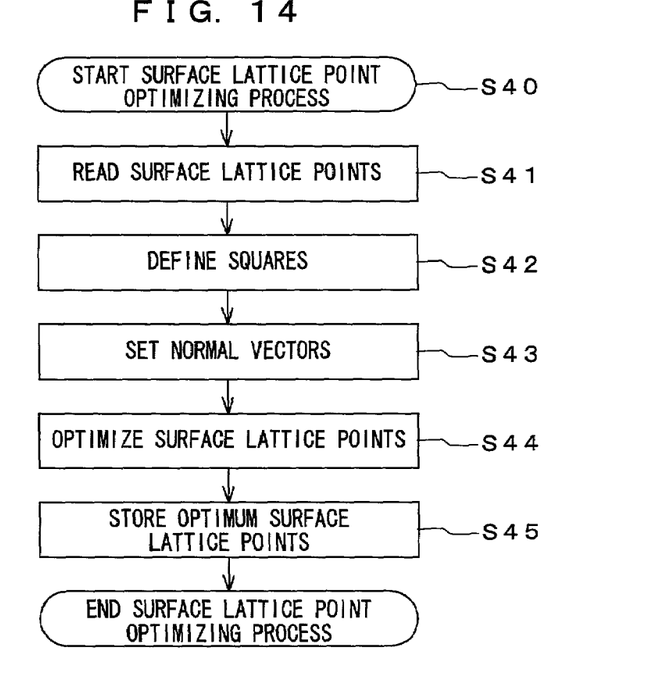
FIG. 14 is a flow chart for explaining the surface lattice point optimizing process to be performed by a surface lattice point optimizing section.

The surface lattice point optimizing process (Step S40) is performed by the surface lattice point optimizing section 14. As shown in FIG. 14, the surface lattice point optimizing section 14 reads the three-dimensional lattice point data constituted by the surface lattice points P from the surface lattice point storage section 8 (Step S41). As shown in FIG. 7, the surface lattice point optimizing section 14 defines a multiplicity of squares G by adjacent surface lattice points P (Step S42), and sets normal vectors f on the respective squares G (Step S43). Then, the surface lattice point optimizing section 14 analyzes the directions of the respective normal vectors f to determine the characteristic configuration of the workpiece to be obtained after the machining, and combines coplanar adjacent squares G with each other to extract surface lattice points P which define the resulting greater-size squares G for optimization of the surface lattice points P (Step S44). The surface lattice point optimizing section 14 stores three-dimensional lattice point data constituted by the optimum surface lattice points P in the optimum surface lattice point storage section 9 (Step S45).

(5) Shape Data Generating Process

Figure 15:
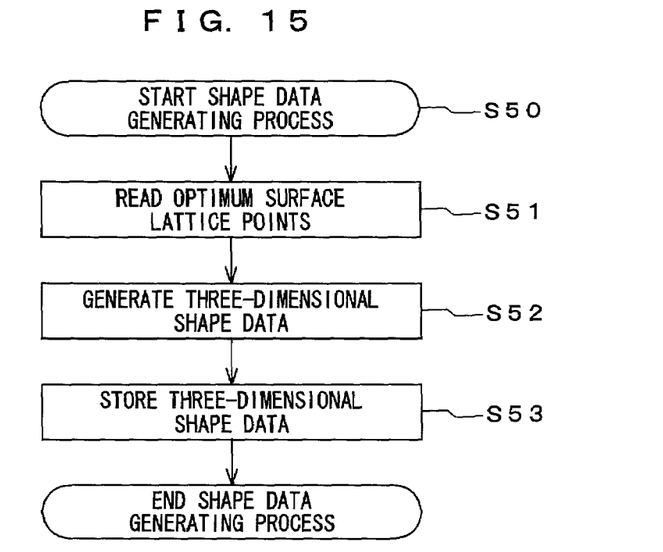
FIG. 15 is a flow chart for explaining a shape data generating process to be performed by a shape data generating section.

The shape data generating process (Step S50) is performed by the shape data generating section 15. As shown in FIG. 15, the shape data generating section 15 reads the three-dimensional lattice point data constituted by the optimum surface lattice points P from the optimum surface lattice point storage section 9 (Step S51), and defines surfaces of the workpiece to be obtained after the machining by interconnecting each two adjacent optimum surface lattice points P located in any of the six axial directions (−x, +x, −y, +y, −z, +z) on the basis of coordinate data and connection information for the optimum surface lattice points P. The each two adjacent optimum surface lattice points P to be interconnected are determined on the basis of the coordinate data and the six axial direction connection signs in the connection information, whereby the post-machining three-dimensional shape data for the workpiece is generated. The shape and dimensions of the workpiece to be obtained after the machining are computed on the basis of the coordinate data for the optimum surface lattice points P (Step S52). Then, the shape data generating section 15 stores the generated three-dimensional shape data in the shape data storage section 10 (Step S53).

The three-dimensional shape data stored in the shape data storage section 10 is outputted to the output device 18 via the bus line 2 and the input-output interface 16, and subjected to a predetermined process so as to be used for modification or regeneration of the NC program.

With the three-dimensional shape data generating apparatus 1 and the three-dimensional shape data generating method according to the present invention, the NC program can retrospectively be analyzed for the generation of the post-machining three-dimensional shape data for the workpiece, and the final shape and dimensions of the workpiece can be determined on the basis of the three-dimensional shape data thus generated. Therefore, the NC program can be modified or regenerated by properly processing the three-dimensional shape data obtained by the retrospective analysis of the NC program, even if a machining factory receives only the NC program from a customer. This leads to an improved productivity at the machining factory, and makes it possible to deal with a machining defect. In addition, three-dimensional shape data may be accumulated for accumulation of machining condition data of tool for workpieces.

The three-dimensional shape data can be generated on the basis of the surface lattice points discriminated from the inside lattice points by performing the surface lattice point extracting process, so that the arrangement for the determination of the three-dimensional shape data can be simplified. As a result, a storage capacity required for storing the three-dimensional shape data can be reduced.

The shape of the workpiece to be obtained after the machining can be defined by a possible minimum number of surface lattice points by performing the surface lattice point optimizing process, so that the time required for generating the three-dimensional shape data on the basis of these surface lattice points can be reduced. Further, the storage capacity required for the storage of the three-dimensional shape data can be minimized.

The three-dimensional shape data generating apparatus and the three-dimensional shape data generating method according to the present invention are not limited to those shown in FIGS. 1 to 15, but the invention may be embodied in the following manner.

(A) The three-dimensional shape data generating apparatus and the three-dimensional shape data generating method according to the present invention do not necessarily require the surface lattice point extracting section 13 and the surface lattice point optimizing section 14 (and the storage sections 8, 9). Without the provision of the surface lattice point extracting section 13 and the surface lattice point optimizing section 14, the shape data generating section 15 shown in FIG. 1 may be adapted to read the post-machining three-dimensional lattice point data L from the post-machining lattice point storage section 7 and generate the post-machining three-dimensional shape data for the workpiece on the basis of the coordinate data and the connection information for the respective lattice points P of the post-machining three-dimensional lattice point data L. In the three-dimensional shape data generating method, the surface lattice point extracting process and the surface lattice point optimizing process may be obviated, so that the shape data generating process follows the tool path process.

(B) The three-dimensional shape data generating apparatus does not necessarily require the surface lattice point optimizing section 14 (and the storage section 9). Without the provision of the surface lattice point optimizing section 14, the shape data generating section 15 may be adapted to read the post-machining three-dimensional lattice point data L from the surface lattice point storage section 8 and generate the post-machining three-dimensional shape data for the workpiece on the basis of the coordinate data and the connection information for the surface lattice points P of the post-machining three-dimensional lattice point data L. In the three-dimensional shape data generating method, the surface lattice point optimizing process may be obviated, so that the shape data generating process follows the surface lattice point extracting process.

(C) The three-dimensional shape data generating apparatus may be provided separately from the NC machine tool or integrated in the NC machine tool.

What is claimed is:

1. An apparatus for generating post-machining three-dimensional shape data indicative of a shape of a workpiece to be obtained after machining on the basis of an NC program including tool traveling path for a tool, tool shape data indicative of a shape of the tool and stock blank shape data indicative of a shape of a stock blank for the workpiece to be machined with the tool in an NC machine tool, the apparatus comprising:

a processor with memory comprising:

a stock blank lattice point generating section which represents the shape of the stock blank for the workpiece by three-dimensional lattice point data comprising a multiplicity of lattice points arranged along three axes extending perpendicularly to each other on the basis of the stock blank shape data, the multiplicity of lattice points being each defined by three-dimensional coordinate data and connection information indicative of whether or not lattice points are present at positions adjacent to a lattice point of interest along the three axes in the six axial directions, wherein the three-dimensional coordinate data used to define one lattice point are not connection information used to define another lattice point;

a tool path processing section which generates data indicative of a tool traveling region in which the tool is to move with respect to the workpiece on the basis of the NC program, the tool shape data and the stock blank shape data, then removes lattice points of the three-dimensional lattice point data located in the tool traveling region, and updates connection information for the remaining lattice points;

a shape data generating section which generates the post-machining three-dimensional shape data for the workpiece on the basis of three-dimensional coordinate data and the connection information for the remaining lattice points; and a surface lattice point extracting section which extracts surface lattice points defining surfaces of the workpiece to be obtained after the machining on the basis of the connection information for the remaining lattice points after the connection information for the remaining lattice points is updated by the tool path processing section, wherein the shape data generating section generates the post-machining three-dimensional shape data for the workpiece on the basis of three-dimensional coordinate data and connection information for the surface lattice points, and wherein said extracted surface lattice points are not expressed in the form of blocks.

2. A three-dimensional shape data generating apparatus as set forth in claim 1, further comprising:

an optimizing section which defines squares by adjacent surface lattice points after the extraction of the surface lattice points, sets normal vectors on the respective squares, combines adjacent squares having parallel normal vectors with each other, and extracts optimum surface lattice points which define greater-size squares obtained by combining the adjacent squares, wherein the shape data generating section generates the post-machining three-dimensional shape data for the workpiece on the basis of three-dimensional coordinate data and connection information for the extracted optimum surface lattice points.

3. An apparatus for generating post-machining three-dimensional shape data indicative of a shape of a workpiece to be obtained after machining on the basis of an NC program including tool traveling path for a tool, tool shape data indicative of a shape of the tool and stock blank shape data indicative of a shape of a stock blank for the workpiece to be machined with the tool in an NC machine tool, the apparatus comprising:

a processor with memory comprising:

a stock blank lattice point generating section which represents the shape of the stock blank for the workpiece by three-dimensional lattice point data comprising a multiplicity of lattice points arranged along three axes extending perpendicularly to each other on the basis of the stock blank shape data, the multiplicity of lattice points being each defined by three-dimensional coordinate data and connection information including six connection signs indicative of whether or not lattice points are present at positions adjacent to a lattice point of interest along the three axes in the six axial directions;

a tool path processing section which generates data indicative of a tool traveling region in which the tool is to move with respect to the workpiece on the basis of the NC program, the tool shape data and the stock blank shape data, then removes lattice points of the three-dimensional lattice point data located in the tool traveling region, and updates connection information for the remaining lattice points;

a shape data generating section which generates the post-machining three-dimensional shape data for the workpiece on the basis of three-dimensional coordinate data and the connection information for the remaining lattice points; and a surface lattice point extracting section which extracts surface lattice points defining surfaces of the workpiece to be obtained after the machining on the basis of the connection information for the remaining lattice points after the connection information for the remaining lattice points is updated by the tool path processing section, wherein the shape data generating section generates the post-machining three-dimensional shape data for the workpiece on the basis of three-dimensional coordinate data and connection information for the surface lattice points, and wherein said extracted surface lattice points are not expressed in the form of blocks.

4. A three-dimensional shape data generating apparatus as set forth in claim 3, further comprising:

an optimizing section which defines squares by adjacent surface lattice points after the extraction of the surface lattice points, sets normal vectors on the respective squares, combines adjacent squares having parallel normal vectors with each other, and extracts optimum surface lattice points which define greater-size squares obtained by combining the adjacent squares, wherein the shape data generating section generates the post-machining three-dimensional shape data for the workpiece on the basis of three-dimensional coordinate data and connection information for the extracted optimum surface lattice points.

* * * * *